United States Patent [19]
Stoffel et al.

[11] Patent Number: 6,139,139
[45] Date of Patent: Oct. 31, 2000

[54] COLOR INKJET PRINTER WITH PENS CONTAINING REACTIVE INKS

[75] Inventors: John L. Stoffel, San Diego, Calif.;
James P. Shields, Corvallis, Oreg.;
Mark S. Hickman, Vancouver, Wash.;
Raymond J. Adamic, Corvallis, Oreg.;
Mark L. Choy, Escondido, Calif.

[73] Assignee: Hewlett-Packard Company, Palo Alto, Calif.

[21] Appl. No.: 08/868,028

[22] Filed: Jun. 3, 1997

Related U.S. Application Data

[63] Continuation of application No. 08/398,730, Mar. 6, 1995, abandoned, which is a continuation-in-part of application No. 07/926,259, Aug. 5, 1992, Pat. No. 5,428,383, and a continuation-in-part of application No. 08/223,787, Apr. 6, 1994, Pat. No. 5,555,008, which is a continuation of application No. 08/085,782, Jul. 6, 1993, abandoned.

[51] Int. Cl.[7] .............................. B41J 2/17; G01D 11/00
[52] U.S. Cl. ............................................ 347/96; 347/100
[58] Field of Search ........................................ 347/96, 100

[56] References Cited

U.S. PATENT DOCUMENTS

| | | | |
|---|---|---|---|
| 5,091,005 | 2/1992 | Mueller et al. | 106/22 |
| 5,098,476 | 3/1992 | Baker | 106/22 |
| 5,100,470 | 3/1992 | Hindagolla et al. | 106/22 |
| 5,106,416 | 4/1992 | Moffatt et al. | 106/20 |
| 5,108,503 | 4/1992 | Hindagolla et al. | 106/22 |
| 5,108,504 | 4/1992 | Johnson | 347/100 |
| 5,112,399 | 5/1992 | Slevin et al. | 106/22 |
| 5,116,409 | 5/1992 | Moffatt | 106/22 |
| 5,118,350 | 6/1992 | Prasad | 106/22 |
| 5,133,803 | 7/1992 | Moffatt | 106/25 |
| 5,181,045 | 1/1993 | Shields et al. | 347/100 |
| 5,196,056 | 3/1993 | Prasad | 106/15.05 |
| 5,198,023 | 3/1993 | Stoffel | 347/100 |
| 5,320,668 | 6/1994 | Shields et al. | 347/100 |
| 5,342,440 | 8/1994 | Wickramanayake | 106/22 R |
| 5,428,383 | 6/1995 | Shields et al. | 347/96 |
| 5,555,008 | 9/1996 | Stoffel et al. | 347/100 |
| 5,734,403 | 3/1998 | Suga et al. | 347/101 |
| 5,798,776 | 8/1998 | Uchiyama et al. | 347/43 |

FOREIGN PATENT DOCUMENTS

| | | | |
|---|---|---|---|
| 581135 A1 | 2/1994 | European Pat. Off. | |
| 0633142A1 | 1/1995 | European Pat. Off. | 347/100 |

*Primary Examiner*—John Barlow
*Assistant Examiner*—Michael S Brooke
*Attorney, Agent, or Firm*—Dennis G. Stenstrom

[57] ABSTRACT

Described is a color inkjet printer for optimum bleed prevention in a printer utilizing multiple black and color pens wherein there is provided one print cartridge for dispensing black ink onto the printing medium and at least one print cartridge for dispensing color ink onto the printing medium. The cartridge for dispensing black ink contains an ink with little or no surface active agent while the cartridge for dispensing color ink contains a sufficient amount of surface active agent to reduce bleed between the colors. Moreover, the cartridge for dispensing black ink contains an ink which reacts with at least one and more preferably all inks contained in the cartridge for dispensing color ink. This reaction reduces bleed on images where the black print is adjacent to the color print to an acceptable level without requiring the black ink to contain surface active agents that would lead to inferior quality black text on the plain paper print medium. The reaction may be initiated by pH changes, reaction between the actual colorants, or reaction between one of the colorants and a component in the other ink.

2 Claims, 5 Drawing Sheets

COLOR INKJET PRINTER WITH PENS CONTAINING REACTIVE INKS

CROSS-REFERENCE TO RELATED APPLICATIONS

The present application is a continuation of application Ser. No. 08/398,730, filed Mar. 6, 1995, now abandoned, which is a continuation-in-part of each of the following applications: (1) application Ser. No. 07/926,259, filed Aug. 5, 1992, now U.S. Pat. No. 5,428,383, issued Jun. 27, 1995; and (2) application Ser. No. 08/223,787, filed Apr. 6, 1994, now U.S. Pat. No. 5,555,008, issued Sep. 10, 1996, which in turn is a continuation of application Ser. No. 08/085,782, filed Jul. 6, 1993, now abandoned.

FIELD OF THE INVENTION

This invention relates generally to the field of thermal inkjet printers and more particularly to improving black text quality and color images in thermal inkjet printers using multiple black and color inkjet pen cartridges containing reactive inks.

BACKGROUND OF THE INVENTION

Inkjet printers have gained wide acceptance. These printers are described by W. J. Lloyd and H. T. Taub in "Ink Jet Devices," Chapter 13 of *Output Hardcopy Devices* (Ed. R. C. Durbeck and S. Sherr, San Diego: Academic Press, 1988) and U.S. Pat. Nos. 4,490,728 and 4,313,684. Inkjet printers produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or "pixels". Thus, the printing operation can be viewed as the filling of a pattern of dot locations with dots of ink.

Inkjet printers print dots by ejecting very small drops of ink onto the print medium and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed nozzles attached to a printhead substrate that incorporates an array of firing chambers which receive liquid ink from the ink reservoir. Each chamber has a thin-film resistor, known as an inkjet firing chamber resistor, located opposite the nozzle so ink can collect between it and the nozzle. The firing of ink droplets is typically under the control of a microprocessor, the signals of which are conveyed by electrical traces to the resistor elements. When electric printing pulses heat the inkjet firing chamber resistor, a small portion of the ink next to it vaporizes and ejects a drop of ink from the printhead. Properly arranged nozzles form a dot matrix pattern. Properly sequencing the operation of each nozzle causes characters or images to be printed upon the paper as the printhead moves past the paper. The ink cartridge containing the nozzles is moved repeatedly across the width of the medium to be printed upon. At each of a designated number of increments of this movement across the medium, each of the nozzles is caused either to eject ink or to refrain from ejecting ink according to the program output of the controlling microprocessor. Each completed movement across the medium can print a swath approximately as wide as the number of nozzles arranged in a column of the ink cartridge multiplied times the distance between nozzle centers. After each such completed movement or swath the medium is moved forward the width of the swath, and the ink cartridge begins the next swath. By proper selection and timing of the signals, the desired print is obtained on the medium.

Color inkjet printers commonly employ a plurality of print cartridges, usually either two or four, mounted in the printer carriage to produce a full spectrum of colors. In a printer with four cartridges, each print cartridge contains a different color ink, with the commonly used base colors being cyan, magenta, yellow, and black. In a printer with two cartridges, one cartridge usually contains black ink with the other cartridge being a tri-compartment cartridge containing the base color cyan, magenta and yellow inks. The base colors are produced on the media by depositing a drop of the required color onto a dot location, while secondary or shaded colors are formed by depositing multiple drops of different base color inks onto the same dot location, with the overprinting of two or more base colors producing the secondary colors according to well established optical principles.

Ink-jet inks are mostly available as dye-based compositions. Typically, these inks comprise one or more water-soluble dyes and an aqueous vehicle containing one or more water-miscible organic solvents. Additionally, these inks may further comprise additives to improve a given property, such as waterfastness, color bleed, and the like. Various patents have been issued dealing with dye-based color components; examples of such patents, which are assigned to the same assignee as the present application, include U.S. Pat. Nos. 5,091,005; 5,098,476; 5,100,470; 5,106,416; 5,108,503; 5,112,399; 5,116,409; 5,118,350; 5,133,803; 5,196,056; and 5,198,023. In addition to dye-based inks, a limited number of pigment-based inks are also available. Pigment-based inks typically comprise one or more pigmented color components dispersed in a vehicle with a dispersant. Pigment-based inks offer two very desirable properties: waterfastness and lightfastness. However, they have not found extensive use in ink-jet ink compositions partly due to their natural tendency to agglomerate in aqueous media as well as their lack of uniform size distribution. Moreover, inks employing pigments as colorants do not avoid the problem of color bleed similarly experienced with dye-based inks.

Color bleed is a significant problem that can occur when multi-color images are printed using thermal inkjet technology as described above. In general and for the purposes set forth herein, color bleed is a term used to describe the diffusion/mixture of at least two different colored ink regions into each other. Such diffusion/mixture normally occurs when the different colored regions are printed next to and in contact with each other (e.g. at their marginal edges). For example, if a region consisting of a first coloring agent (e.g. black) is printed directly adjacent to and against another region consisting of a second coloring agent (e.g. yellow), the first coloring agent will often diffuse or "bleed" into the second coloring agent, with the second coloring agent possibly bleeding into the first coloring agent.

Accordingly, indistinct images with a poor degree of resolution are produced. An insufficient degree of resolution results from the production of jagged, nonlinear lines of demarcation between adjacent colored regions instead of sharp borders therebetween. This can create significant problems, especially when high volume printing systems are used to print complex, multi-color images.

In addition, color bleed problems in multi-ink systems are also caused by strong capillary forces generated in many commonly-used paper substrates. These capillary forces cause a "wicking" effect in which coloring agents are drawn into each other by capillary action through the fibers of the paper materials. This situation also results in a final printed image of poor quality and definition.

Prior solutions to bleed have largely involved the use of accelerated drying, the use of a separate fixer solution to pre-coat the paper, or the use of special paper. A known solution of the bleed problem is to accelerate the evaporating of the solvent by heating the print medium as it is being printed and/or circulating dry air over the freshly printed image; however excessive heating interferes with the proper adherence between the ink and the print medium, and may also cause the less densely inked areas to shrink and/or to become brittle and discolored. Moreover, heating systems add cost and complexity to the printer. Fixing solutions also add cost and additional liquid to be dispensed. Special paper limits the user to a small, select group of papers that are more expensive than plain paper.

Bleed control has also been accomplished in different ways by the printer's "print mode" techniques, whereby adjacent dots are placed on successive sweeps by the pen in specified patterns and with fixed time delays between printing adjacent dots. However, such solutions decrease the throughput of the printer. At a time when the printer industry is in a pursuit to increase the throughput of printers, such a solution is unsatisfactory.

Other proposed solutions to the problem of bleed involve changing the composition of a thermal ink-jet ink to reduce bleed. For example, surfactants have been used to increase the penetration rate of the ink into the paper by reducing the surface tension of the ink. By increasing the penetration rate of inks into the paper, bleed is reduced between adjacently printed inks. However, increasing the penetration rate in this fashion may also reduce edge acuity.

Another method of reducing bleed between ink-jet inks involves employing a precipitating agent in a first ink to induce the precipitation of the colorant in a second ink printed adjacent to and in contact with the first ink. For example, U.S. Pat. No. 5,198,023 (issued Mar. 30, 1993 and assigned to the same assignee as the present application) discloses incorporating multivalent cations such as calcium chloride and magnesium chloride into yellow cationic aqueous-based inks to prevent bleed between yellow and black inks by precipitating the carboxyl/carboxylate group associated with the black colorant.

Another method of reducing bleed between ink-jet inks involves the use of pH-sensitive dyes as disclosed in U.S. Pat. No. 5,181,045, entitled "Bleed Alleviation Using pH-Sensitive Dyes", issued Jan. 19, 1993 and assigned to the same assignee as the present application. It is disclosed therein that an ink having a pH sensitive dye would be prevented from bleeding into an adjacent ink having an appropriate pH. More particularly, the migration of the ink having the pH-sensitive dye is prevented by rendering the dye insoluble on the print medium by contact with the pH of the adjacent ink.

In addition to employing surfactants, precipitating agents, and pH-sensitive dyes to achieve bleed control, other available means of achieving bleed control between adjacently printed inks include (1) pairing an ink having a water-soluble colorant with an oil-based ink (see, e.g., U.S. Pat. No. 5,342,440, entitled "Black-to-Color Bleed Control in Thermal InkJet Printing); (2) pairing inks having colorants that, together, form an insoluble salt pair; and (3) pairing an ink having a pigment dispersed with a negatively charged dispersant with an ink having a vehicle containing a cationic charged polymer.

Notably, of all of the above-described methods for achieving bleed control by ink composition, only the method involving the addition of surfactants can be administered without also changing the composition or properties of a second ink. Therefore, most strategies to reduce bleed rely, to at least some extent, upon the addition of a surface active agent.

While the addition of a surface active agent may decrease edge acuity, the viscosity of the ink also plays an important, albeit lesser, role in the degree of edge of acuity exhibited by an ink. Viscosity controls the amount of ink dot spread, with a higher viscosity limiting dot spread. Accordingly, edge acuity is reduced for an ink that has a high lateral spread on the paper. Dot gain is defined herein as the amount of spread for a given dot size compared to no spreading. Thus, a low dot gain ink does not spread as much as a high dot gain ink. Another way of viewing this is that for a given dot size, where a smaller drop volume gives the same dot size as a larger volume of ink, gain is attained.

A high dot gain ink is advantageous in several ways. By employing a high dot gain ink, one may use a lower drop volume of ink. The amount of ink used to print a page may therefore be decreased for high dot gain ink, translating to a lower cost per page. Moreover, cockle of the paper may be reduced by employing a lower drop volume of ink because of the lesser amount of water contacting the paper. Therefore, a print cartridge with a high dot gain ink is advantageous in reducing cost-per-page, bleed, and paper cockle. However, the best edge acuity of a high dot gain ink is inferior to the best edge acuity of a low dot gain ink.

Essentially, the advantages of a high dot gain ink, namely reduced cost-per-page, bleed and paper cockle, must be balanced against the reduced edge acuity for such ink. When printing black text, edge acuity is an important feature. However, edge acuity is less important when printing color text because the contrast between the color print and a white paper is less than the contrast between black print and the white paper. Furthermore, reductions in bleed, paper cockle, and cost are more important when printing a color image because large amounts of ink are utilized. It is therefore advantageous for a printer to employ a print cartridge containing a low dot gain black ink and at least one other print cartridge containing a high dot gain color ink.

It will be appreciated by those skilled in this art that reducing the amount of ink used to jet a given droplet of ink while maintaining a high edge acuity for text printing requires balancing various considerations. Thus, an ink set that combines the advantages of all types of inks, both high dot gain and low dot gain as well as pigment-based and dye-based, while alleviating the disadvantages of each, is desired.

A need remains for an inkjet printer that employs an optimum blend of inks in an ink set, thereby producing high quality black text as well as high quality graphics images at a high through-put rate. The formation of high quality black text and color images onto a print medium requires a delicate balance of competing requirements. For example, a black ink should employ surface active agents in a sufficient concentration to avoid bleed, but must also minimize or eliminate the concentration of surface active agents in order to produce good text quality with good edge acuity. On the other hand, superior edge acuity may be sacrificed in color inks to achieve more important reductions in bleed, paper cockle, and cost-per-page.

The present invention represents a unique and highly effective approach in the control of color bleed in multi-color thermal inkjet printing systems. The methods described herein may be implemented at a minimal cost, and do not require the use of extra equipment, custom manu-factured paper, and/or special paper coatings. The present invention therefore represents an advance in the art of thermal inkjet printing technology as described in greater detail below.

SUMMARY OF THE INVENTION

In accordance with the present invention, a color inkjet printer is provided, with one print cartridge for dispensing black ink onto the printing medium and at least one print cartridge for dispensing color ink onto the printing medium. The cartridge for dispensing black ink contains an ink with little or no surface active agent while the cartridge for dispensing color ink contains a sufficient amount of surface active agent to reduce bleed between the colors. As defined herein, an ink contains little or no surface active agent if its surface tension exceeds about 30 dynes/cm. Moreover, the cartridge for dispensing black ink contains an ink which reacts with each of the color inks contained in the cartridge for dispensing color ink. This reaction reduces bleed on images where the black print is adjacent to the color print to an acceptable level without requiring the black ink to contain surface active agents that would lead to inferior quality black text on the plain paper print medium. The reaction may be initiated by reaction of a pH-sensitive component of one ink to the pH of the other ink, reaction between the actual colorants, or reaction between one of the colorants and a component in the other ink. The print cartridges are mounted in a carriage assembly of an inkjet printing mechanism for applying liquid ink to a print medium as successive columns of dots contained within a horizontal swath to thereby form a portion of the image. A drive mechanism is provided for moving the carriage hori-zontally relative to the print medium to thereby move the printhead across a horizontal swath.

In accordance with this invention, optimum bleed pre-vention is attained in a printer utilizing multiple black and color pens.

DETAILED DESCRIPTION OF THE PREFERRED EMBODIMENT

Figure 1:
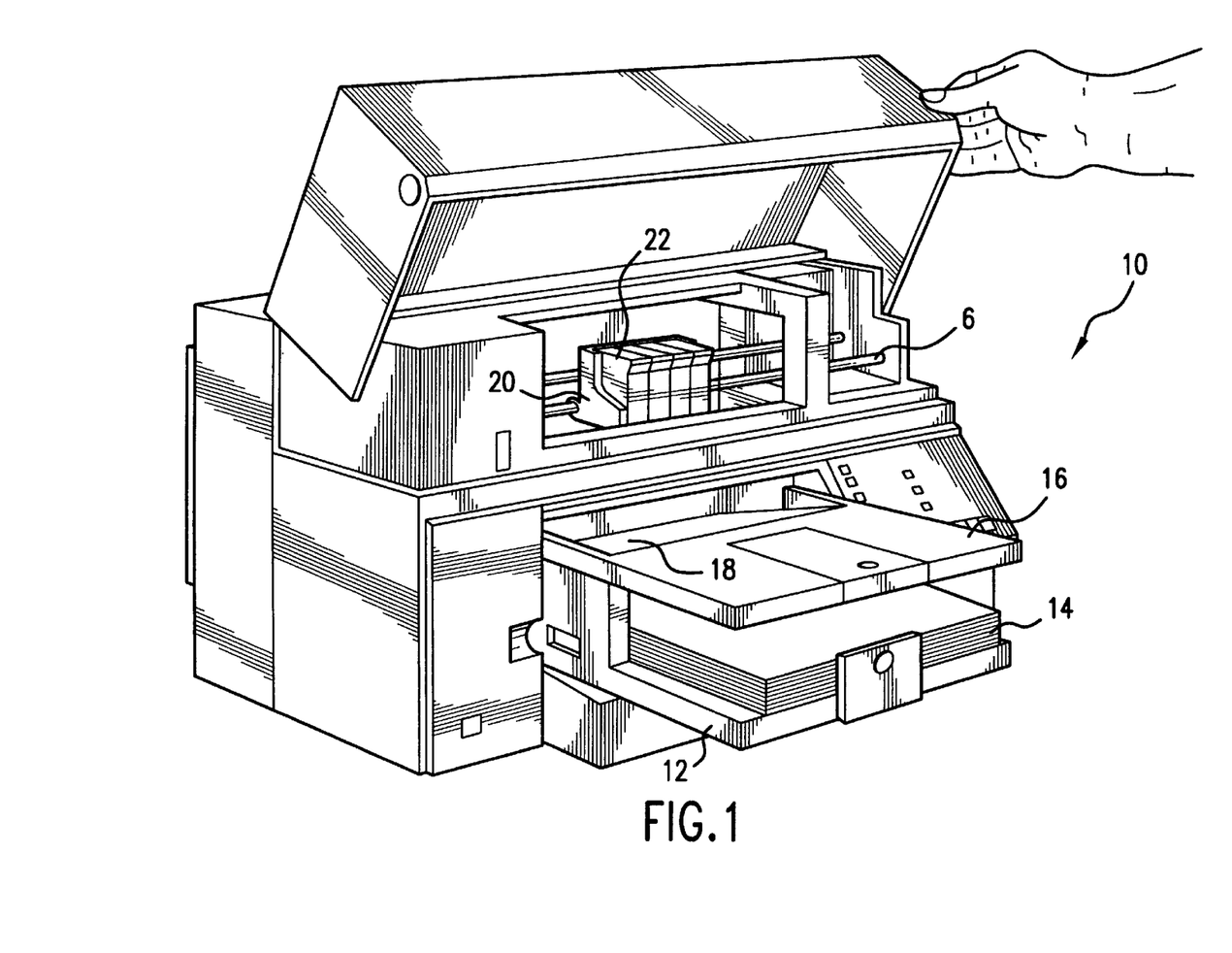
FIG. 1 is a perspective view showing a inkjet printer incorporating the present invention.
Figure 3:
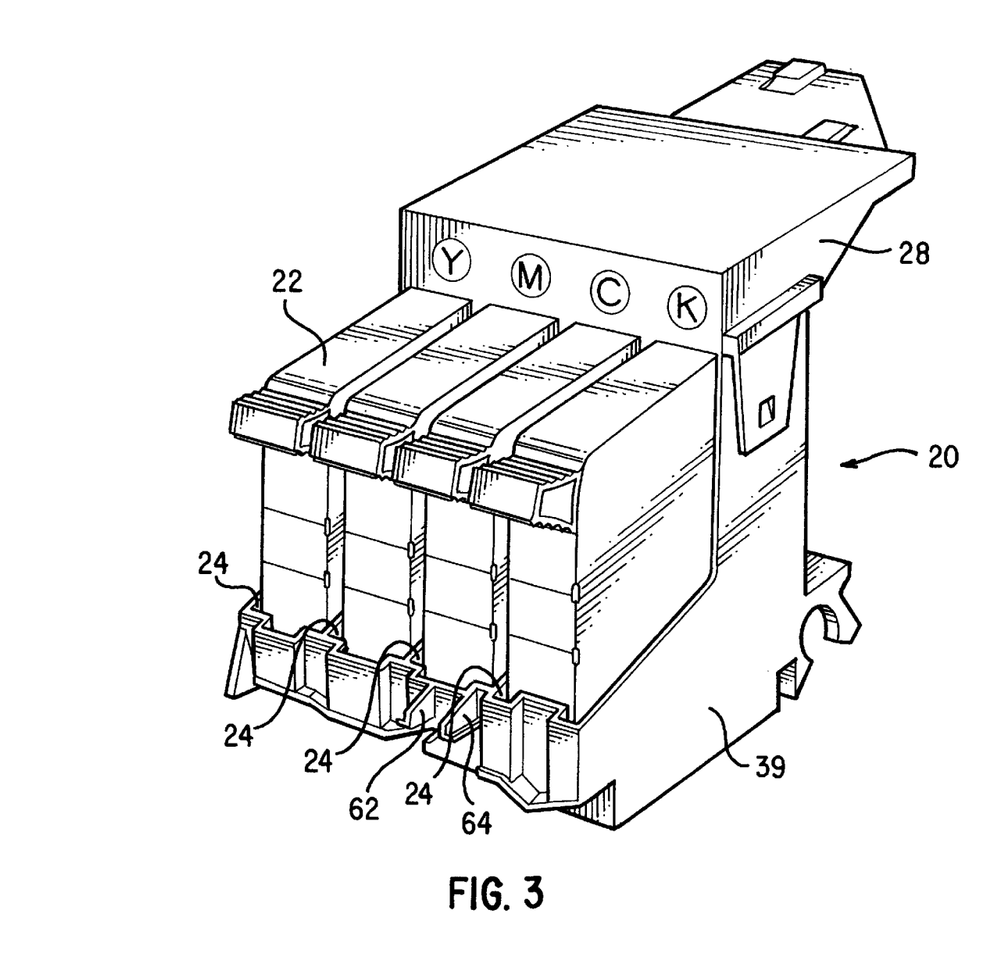
FIG. 3 is a perspective view of a inkjet printer carriage.

FIG. 1 shows a color inkjet printer 10 incorporating the present invention. In particular, inkjet printer 10 includes a movable carriage assembly 20 supported on slider rod 6 at the rear and a slider bar (not shown) at the front. Inkjet printer 10 also is provided with input tray 12 containing a number of sheets of paper or other suitable ink receiving medium 14, and an upper output tray 16 for receiving the printed media 18. As shown in FIG. 3, movable carriage 20 includes a plurality of individual cartridge receptacles 24 for receiving a respective plurality of thermal ink jet printer cartridges 22.

Figure 2:
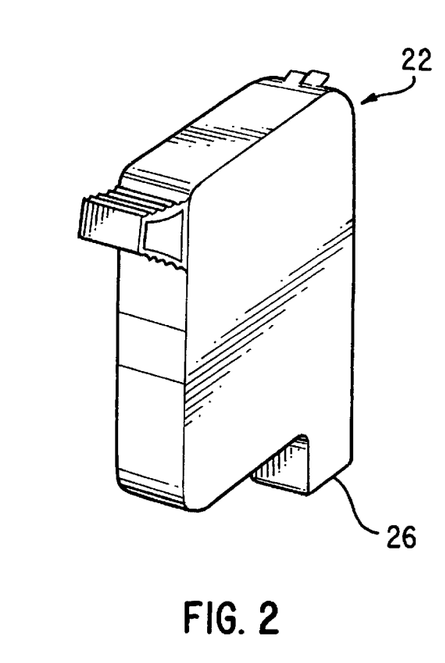
FIG. 2 is a perspective view of a inkjet cartridge in accordance with this invention.

FIG. 2 is a more detailed illustration of an inkjet pen cartridge 22 that stores ink and has a printhead 26 which when activated by firing pulses causes ink to be ejected from nozzles in the inkjet pen printhead 26. FIG. 3 illustrates four inkjet pen cartridges 22 installed in four ink cartridge receptacles 24 in carriage assembly 20 and with carriage cover 28 installed on top of carriage assembly 20. In the printer 10 depicted in FIG. 1, four such cartridges 22 are provided: cyan, yellow, magenta, and black, commonly referred to as CYMK. Together, these four colors provide a wide palette of colors, tints, and hues.

The configuration of the cartridges is immaterial in the practice of the present invention, and may comprise two, three, or four separate cartridges, or pens (as depicted in FIG. 1) or may comprise one pen with two, three, or four print cartridges, each containing a different ink. In a printer with four cartridges, each print cartridge contains a different color ink, with the commonly used base colors being cyan, magenta, yellow, and black. In a printer with two cartridges, one cartridge usually contains black ink with the other cartridge being a tri-compartment cartridge containing the base color cyan, magenta and yellow inks. The base colors are produced on the media by depositing a drop of the required color onto a dot location, while secondary or shaded colors are formed by depositing multiple drops of different base color inks onto the same dot location, with the overprinting of two or more base colors producing the secondary colors according to well established optical prin-ciples.

As used herein, the term "cartridge" is intended to cover both the situation involving separate pens (in which case, pen and cartridge are synonymous) and a monolithic pen containing multiple cartridges. In the latter case, the car-tridges may be individually replaceable or tube-fed with ink from an off-axis ink supply.

The print cartridges may be based on thermal jetting action, employing a plurality of ink firing chambers, each containing a resistor element that, upon energizing, causes a bubble of ink to form, which is expelled through a nozzle toward the print medium. Alternatively, the print cartridge may be based on piezoelectric jetting action, employing a plurality of ink firing chambers, each containing a piezo-electric element that, upon energizing, expels a quantity of ink through a nozzle toward the print medium. Both thermal and piezoelectric print cartridges are well-known in the art of ink-jet printing. Preferably, a thermal ink-jet printer is employed in the practice of the present invention.

Figure 4:
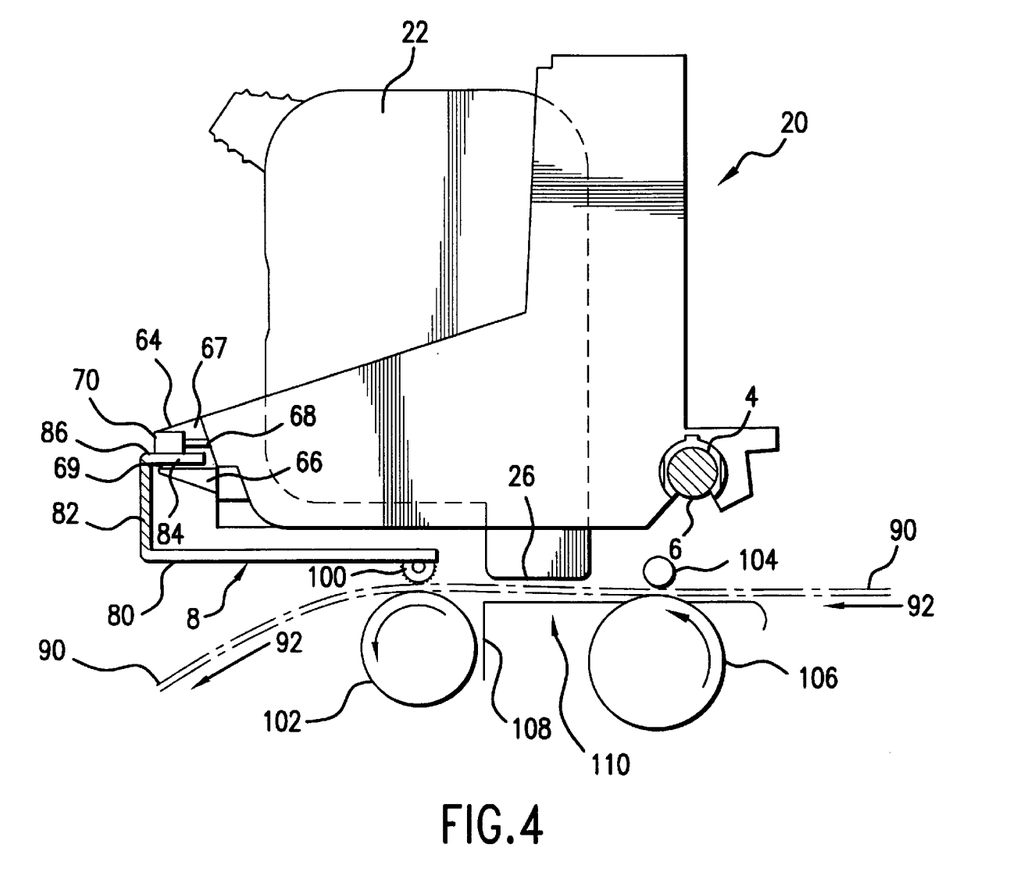
FIG. 4 is a right side elevation view of the carriage of FIG. 3 showing the slider rod and slider bar supports and a portion of the media feed path of the printer of FIG. 1 partly in cross-section.

FIG. 4 shows carriage assembly 20 mounted for sliding movement on slider rod 6 and slider bar 8 which each extend transversely of the path of movement of the paper or other printing medium through the printer. In the embodiment shown, the carriage 20 is supported in the rear on slider rod 6 by two laterally spaced bushings 4 in the lower rear portion of the carriage 20 and in the front by slider bar 8 the upper surface of which comprises a carriage support surface 86 which engages the lower surface of the slider shoe 70 to support the front portion of the carriage 20.

Figure 6:
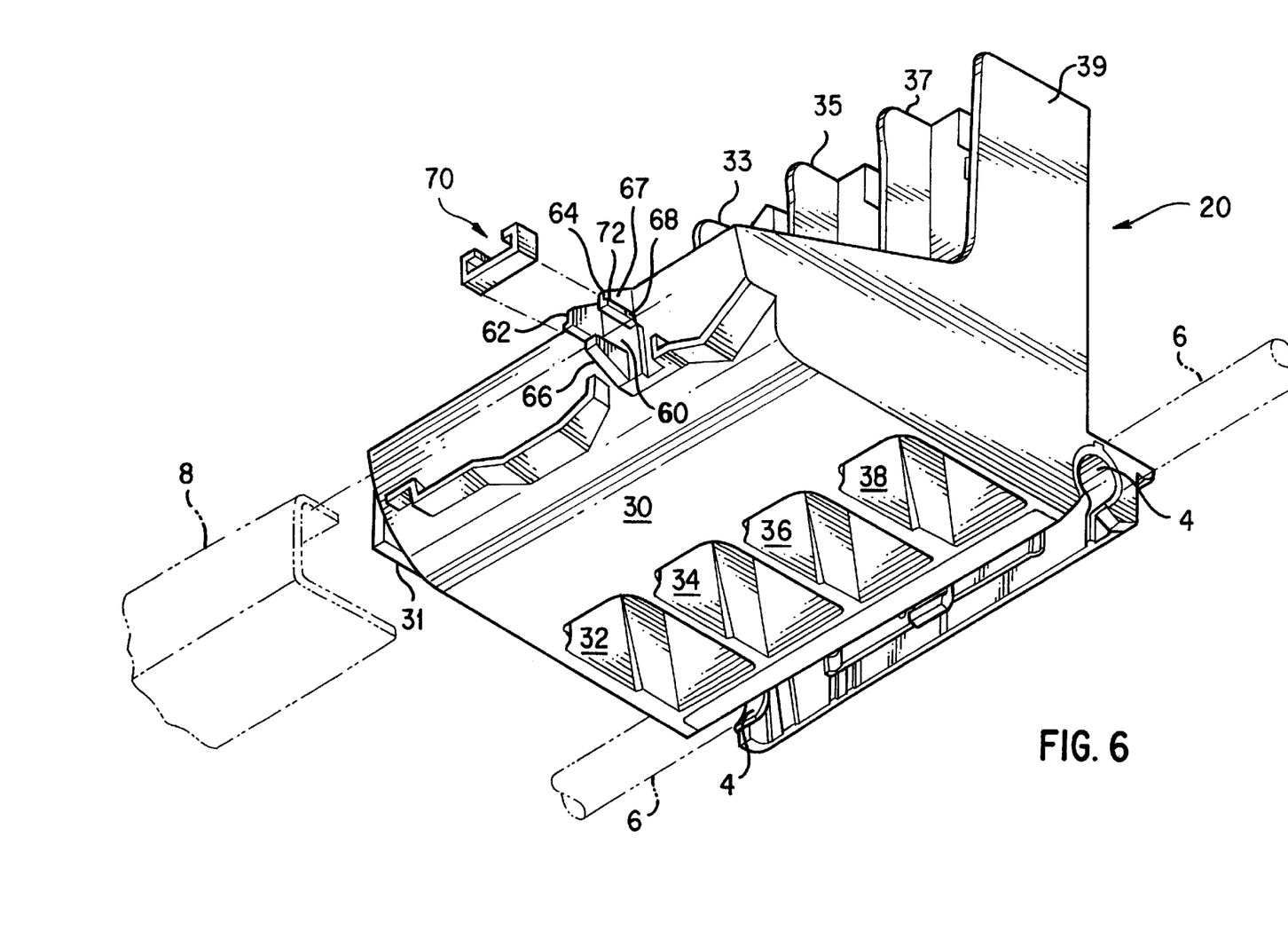
FIG. 6 is a perspective view showing the underside and the right hand side of a printer carriage mountable for sliding movement on a slider rod and slider bar shown in phantom.

FIG. 6 shows a perspective view from the bottom front of carriage assembly 20. In the preferred embodiment, four separate inkjet cartridges 22 are provided for cyan, magenta, yellow and black inks. The carriage 20 comprises a molded plastic member comprised of five generally L-shaped parallel spaced plates 31, 33, 35, 37 and 39 which define four ink cartridge receptacles 24 therebetween. The ink cartridges 22 have printed circuits mounted on their back walls which receive electrical pulses from the printer carriage 20 to energize the printheads 26 (FIG. 2) eject ink drops therefrom. The carriage 20 also has an integrally formed bottom wall 30 provided with four apertures 32, 34, 36 and 38 which receive the narrow snout portion of the ink cartridges 22 containing the printhead 26. Ink is ejected downwardly from nozzles (not shown) in printhead 26 onto the paper or other media.

Figure 5:
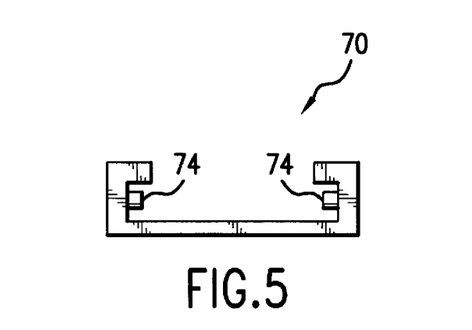
FIG. 5 is an enlarged view of the slider shoe used on the carriage.

Referring to FIGS. 4, 5 and 6, each of the two upper slider bosses 62, 64 on the front wall of carriage 20 has a vertically extending web 67 and an outwardly extending horizontal flange 68 for the purpose of receiving replaceable shoe 70. Each of the flanges 68 has a slight indent (not shown) for reception of a projecting dimple 74 on two opposed flanges of the slider shoe 70 which comprises a channel shaped plastic section whereby slider shoe 70 can be slipped onto the horizontal flanges 68 of the upper bosses 62, 64 wherein the dimples 74 (FIG. 5) will retain the slider shoe 70 on the flanges 68 by engaging the indents 72 therein.

The lower boss 66 on the front wall of the carriage 20 preferably has an upper contact lip 69 (FIG. 4) which does not extend the full length of the boss. The lip 69 and the lower surface of the wear slider shoe 70 are spaced a distance to closely slideably receive an upper flange of the slider bar 8.

Referring to FIG. 4, the slider bar 8 preferably is fabricated from a single piece of sheet metal formed as a channel member having a relatively wide lower flange 80, a vertically extending connecting web 82 and a relatively narrow horizontally extending upper flange 84, the upper surface of which comprises a carriage support surface 86 which engages the lower surface of the slider shoe 70 to support the front portion of the carriage 20. Preferably, the carriage support surface 86 has a high molecular weight polyethylene coating thereon. This coating may be conveniently applied as a strip of tape although other means lubricating the support surface 86 of the slider bar can of course readily be devised by persons skilled in the art.

Referring to FIG. 4, a small portion of the paper path through the printer 10 is illustrated. Each cartridge 22 is supported above the media 90 by the carriage assembly 20 and cartridge receptacle 24, such that printhead 26 is maintained an appropriate printhead-to-media distance from the media 90. The paper 90 is picked from the input tray 12 (FIG. 1) and driven into the paper path in the direction of arrow 92. The leading edge of the paper 90 is then fed into the nip between drive roller 106 and idler or pinch roller 104 and is driven into the print zone 110. A grill screen 108 supports the paper 90 as it is passed through the print zone 110 under printhead 26. After the paper passes through the print area 110 it encounters output roller 102, which propels the media 90 into the output tray 16 (FIG. 1). The drive roller 106 and output roller 102 maintain the print media 90 in a taut condition as it passes under the printhead 26, and advances in a direction perpendicular to the carriage 20 axis defined by slider rod 6.

In the print zone 110, printing onto the upper surface of the media 90 occurs by stopping the drive and output rollers 106, 102, moving the carriage 20 along a swath, and firing the ink cartridges to print a desired swath on the media surface. After printing the desired swath on the media 90 is completed, the drive and output rollers 106, 102 are actuated and the media 90 is driven forward by a swath length, and swath printing commences again.

In the use of an ink-jet printer, the platen may be at ambient temperature or the platen may be heated. A heated platen in conjunction with a thermal ink-jet printer has been disclosed and claimed in application Ser. No. 07/876,942, filed May 1, 1992, and in application Ser. No. 08/056,287, filed Apr. 30, 1993, which is a continuation-in-part application of Ser. No. 07/876,924, filed May 1, 1992, all assigned to the same assignee as the present application. Heated platens are used to dry the ink faster on the print medium, which may be paper, transparency, or other suitable material.

The inkjet nozzles in printhead 26 are carried by carriage 20 which is driven along the support shaft by a mechanism which comprises, for example, a motor and a belt. The inkjet nozzles in printhead 26, when activated, apply droplets of ink onto the paper. Typically, the inkjet nozzles are mounted on the carriage in a direction perpendicular to the direction of the sweep, so that columns of dots are printed in one sweep. The columns of dots made by inkjet nozzles across a horizontal portion of the paper is sometimes called a swath. A swath may be printed by one or more passes of the inkjet nozzles across the same horizontal portion, depending upon the required print mode. In order to reduce undesirable "banding", some of the known printing modes advance the print medium relative to the carriage in the vertical direction by only a fraction of the height of a single swath. In order to reduce "bleeding", multi-pass printing modes may be used in which the dots applied in successive passes are interleaved vertically and horizontally. Moreover, both single pass and multiple pass print modes may employ "Resolution Enhancement Technology" in which additional dots of ink are selectively applied between adjacent pixels to increase image density and/or to provide smoother boundaries for curved or diagonal images.

When a swath is completely printed, the paper is advanced toward the output tray 16, with the assistance of starwheel 100 and an output roller 102 which cooperate to produce a pulling force on the paper. A starwheel is used so that its pointed edges can pull the paper at the printed surface without smearing the ink.

Figure 7:
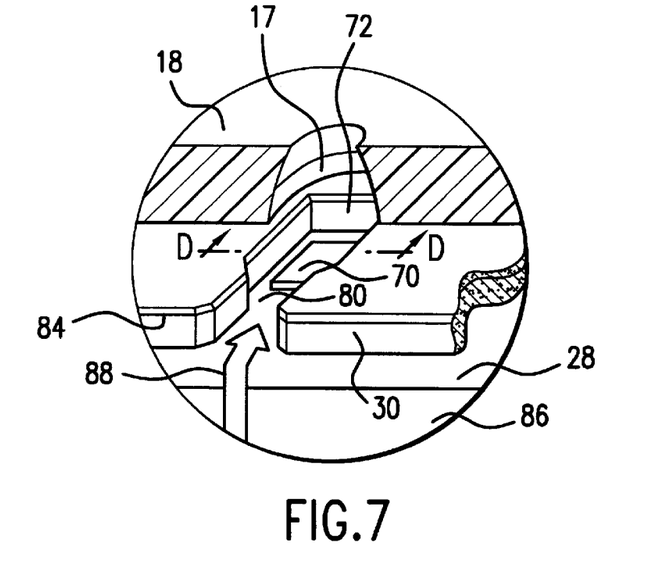
FIG. 7 is a top perspective view, partially cut away, of a portion of the printhead assembly showing the relationship of an orifice with respect to a vaporization chamber, a heater resistor, and an edge of the substrate.

FIG. 7 is an enlarged view of a single vaporization chamber 72, thin film resistor 70, and frustum shaped orifice 17 after the substrate structure 28 is secured to the back of the flexible circuit 18 via the thin adhesive layer 84. A side edge of the substrate 28 is shown as edge 86. In operation, ink flows from the ink reservoir around the side edge 86 of the substrate 28, and into the ink channel 80 and associated vaporization chamber 72, as shown by the arrow 88. Upon energization of the thin film resistor 70, a thin layer of the adjacent ink is superheated, causing explosive vaporization and, consequently, causing a droplet of ink to be ejected through the orifice 17. The vaporization chamber 72 is then refilled by capillary action.

Figure 8:
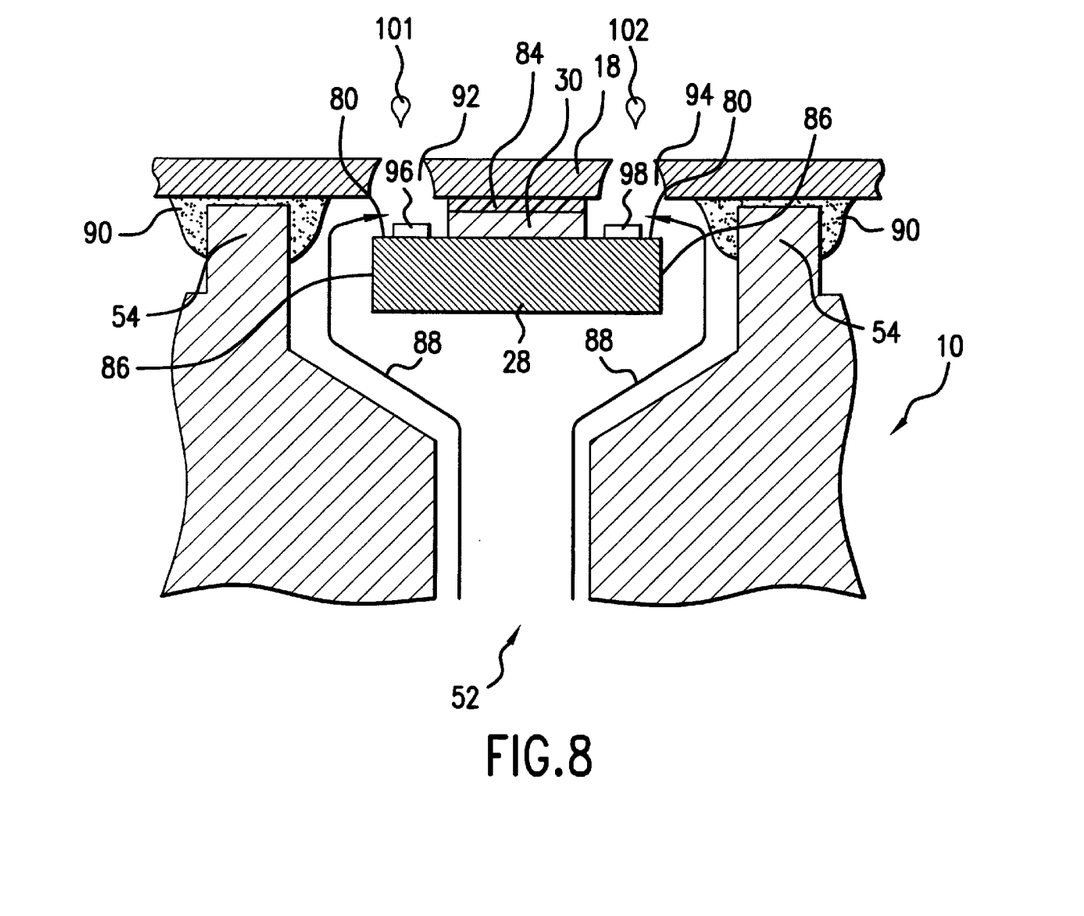
FIG. 8 is a schematic cross-sectional view showing the adhesive seal between the printhead assembly and the print cartridge as well as the ink flow path around the edges of the substrate.

Shown in FIG. 8 is a side elevational view showing a portion of the adhesive seal 90, applied to the inner raised wall 54 and wall openings 55, 56, surrounding the substrate 28 and showing the substrate 28 being adhesively secured to a central portion of the flexible circuit 18 by the thin adhesive layer 84 on the top surface of the barrier layer 30 containing the ink channels and vaporization chambers 92 and 94. A portion of the plastic body of the printhead cartridge 10, including raised walls 54 is also shown.

FIG. 8 also illustrates how ink 88 from the ink reservoir 12 flows through the central slot 52 formed in the print cartridge 10 and flows around the edges 86 of the substrate 28 through ink channels 80 into the vaporization chambers 92 and 94. Thin film resistors 96 and 98 are shown within the vaporization chambers 92 and 94, respectively. When the resistors 96 and 98 are energized, the ink within the vaporization chambers 92 and 94 are ejected, as illustrated by the emitted drops of ink 101 and 102. For further details on the inkjet printhead, see U.S. application Ser. No. 07/862,668, filed Apr. 2, 1992, entitled "Integrated Nozzle Member and TAB Circuit for Inkjet Printhead;" U.S. Pat. No. 5,278,584 to Keefe, et al., entitled "Ink Delivery System for an Inkjet Printhead;" U.S. application Ser. No. 08/179,866, filed Jan. 11, 1994 entitled "Improved Ink Delivery System for an Inkjet Printhead," U.S. patent application Ser. No. 08/319896, filed Oct. 6, 1994, entitled "Inkjet Printhead Architecture for High Speed and High Resolution Printing;" U.S. patent application Ser. No. 08/319404, filed Oct. 6, 1994, entitled "Inkjet Printhead Architecture for High Frequency Operation;" and U.S. patent application Ser. No. 08/319892, filed Oct. 6, 1994, entitled "High Density Nozzle Array for Inkjet Printhead." The above patent and co-pending applications are assigned to the present assignee and are incorporated herein by reference.

It will be appreciated by one skilled in the art, that while the above described printhead is an "edge feed" design whereby the ink flows around the edges of the substrate and directly into ink channels, there are alternate designs, such as described in U.S. Pat. No. 4,683,481 to Johnson, entitled "Thermal Ink Jet Common-Slotted Ink Feed Printhead," whereby ink is fed from an ink reservoir to the various vaporization chambers through an elongated hole formed in the substrate. This design may be classified as a "center feed" design, whereby ink is fed to a manifold area, formed in a barrier layer between the substrate and a nozzle member, then into a plurality of ink channels, and finally into the various vaporization chambers.

In known manner, the image to be printed is defined by the "plot file" which specifies which pixels are and which pixels are not to be coated with dots of ink. For color images, the color of the ink is also specified in the plot file. Typically, a sheet of paper is printed by applying ink at the specified dot positions (pixels). The dots may be printed in single (e.g., black) or multiple colors. To print a multiple color image, the carriage may have to make more than one sweep across the print medium and make two or more drops of ink with different primary colors at the same dot locations ("pixels"), as disclosed in U.S. Pat. No. 4,855,752 which is assigned to the assignee of the present invention and is herein incorporated by reference.

The printer 10 has several different modes of printing. Each of the different modes is used to produce a different type or quality of an image. For example, one or more "high quality" modes can be specified whereby density of the print dots is increased to enhance the quality of the printed images. In some printers, a "high quality" mode of printing may require the printer 10 to make multiple passes across substantially the same horizontal portion of the page. For example, in its high quality three pass mode, printer 10 make three sweeps across the page to print a single swath. In each of the three sweeps, the printer would print one of every three consecutive dots so as to allow more time for one dot to dry before the neighboring dot is printed, and thereby preventing the possibility that the ink of the two neighboring dots would combine to produce an unwanted shape or color. Such a three pass printing mode may also be used to reduce banding by dividing the swath into three reduced-height bands, printed in successive but overlapping printing cycles each providing for three passes across an associated reduced-height band.

Examples of such print modes are described in co-pending U.S. patent application entitled IMPROVED INKJET PRINTER METHOD FOR OPTIMIZED DRY-TIME AND INCREASED THROUGHPUT, filed Mar. 3, 1995, Attorney Docket No. 1094945-1; U.S. patent application entitled IMPROVED MULTI-PASS PRINT MODE AND SYSTEM, filed Mar. 3, 1995, Attorney Docket No. 1094944-1; and U.S. patent application entitled IMPROVED MULTI-PASS PRINT MODE AND SYSTEM, filed Mar. 3, 1995, Attorney Docket No. 1094943-1; which are assigned to the same assignee as this invention and are herein incorporated by reference.

The present invention is applicable to color inkjet printers having a plurality of print cartridges, usually either two or four, mounted in the printer carriage to produce a full spectrum of colors. In a printer with four cartridges, each print cartridge contains a different color ink, with the commonly used colors being cyan, magenta, yellow, and black. In a printer with two cartridges, one cartridge usually contains black ink with the other cartridge being a tri-compartment cartridge containing cyan, magenta and yellow inks.

The present invention is also applicable to printers having fully aligned nozzle arrays, partially overlapping nozzle arrays, or fully staggered nozzle arrays (or where only the black nozzle arrays are staggered to the respective color nozzle arrays). The invention is particularly valuable in printers where the color nozzle arrays (both the tri-compartment and single compartment cyan, magenta and yellow nozzle arrays) are completely overlapped in the carriage scan axis by the black nozzle array. The present invention is also applicable to printers having print cartridges of different swath widths, i.e., lengths of the nozzle arrays. For further details, see U.S. patent application entitled ALIGNMENT OF DIFFERENTLY SIZED PRINT-HEADS IN A PRINTER, filed concurrently herewith, Attorney Docket No. 10950002-1, which is assigned to the present assignee and is herein incorporated by reference.

Further, the present invention is also applicable to printers having print cartridges of different resolutions, such as, for example, a 600 dot-per-inch ("dpi") black cartridge and 300 dpi color cartridges. See U.S. patent application entitled MIXED RESOLUTION PRINTING FOR COLOR AND MONOCHROME PRINTERS, Ser. No. 08/145,261, filed Oct. 29, 1993, which is assigned to the present assignee and is herein incorporated by reference.

In a given print cartridge architecture, an ink containing a surface-active agent produces a larger dot than an ink with no surface-active agent. The greater lateral spreading of these drops is a direct result of greater wettability of the ink to the paper fibers. A negative side effect is a slight loss in text edge acuity on some papers. There are two ways to view dot spread, or gain. The first is to consider the amount of spread on a print medium by a drop of a given volume. The larger the resulting dot size, the larger the dot spread, or gain. Alternatively, for a given dot size measured, the issue is whether it takes a relatively large drop volume to produce that dot size or a smaller drop volume. If a smaller drop volume can produce the same size as a larger drop volume, then dot gain is realized. A low dot spread, or gain, results from little lateral spread, while a large dot spread, or gain, results from considerable lateral spread.

For an ink with high dot spread, certain benefits are realized. First, less ink is required to achieve an acceptable image. This reduces both the cost per copy and the tendency of the paper to cockle when printed with rather large volumes of ink. Further, penetration by the ink into the paper helps to reduce bleed.

There are tradeoffs to consider in this approach, involving both surface tension and viscosity of the ink. Both high surface tension and viscosity tend to limit dot spread. However, these values cannot be so low that spreading is unchecked. Typically, for a relatively high dot spread ink, the surface tension is in the range of about 25 to 40 dyne/cm and the viscosity is in the range of about 1.5 to 10 cp. For a relatively low dot spread ink, the surface tension is in the range of about 45 to 65 dyne/cm and the viscosity is in the range of about 1.5 to 10 cp. For further details, see U.S. patent application, PRINTER WITH PEN CONTAINING A LOW DOT SPREAD BLACK INK AND A HIGH DOT SPREAD COLOR INK, Ser. No. 08/826,304, filed Mar. 27, 1997, now U.S. Pat. No. 5,880,758, issued Mar. 9, 1999, which in turn is a continuation of Ser. No. 08/234,733, filed Apr. 28, 1994, now abandoned which is assigned to the present assignee and is herein incorporated by reference.

To combine the desired high text quality associated with black ink and the desired reduced bleed in printing color graphics, the black ink is formulated for minimal dot spread, while the color inks are formulated for increased dot spread. In order to attain good black text, most strategies rely on avoiding the use of surface active agents in the black ink or reducing or minimizing the amount of surface active agent in the black ink. The increase in dot spread for color inks is achieved by adding one or more surfactants, or surface active agents, to the color inks. Producing good color images necessitates that one reduce the bleed between the colors. Most strategies to reduce bleed rely on or at the very least employ a surface active agent to reduce bleed.

Thus, the formation of high quality black text and color images onto the print medium results from balancing the competing requirements of the individual inks in an ink set. For example, a black ink must employ surface active agents in a sufficient concentration to avoid bleed, but must also minimize or eliminate the concentration of surface active agents in order to produce good text quality.

A printer may deal with these issues by using one of several strategies. First, it may use a black pen containing ink with a minimum concentration of surface active agent and slow down the printer or add a heater to avoid bleed. Second, it may use a combination of the color pens with the color inks containing surface active agents to produce a composite black to produce images and use the black pen containing the black ink to produce high quality text. A third option is to accept the poor quality of text produced from a black pen containing ink that has a sufficient amount of surface active agent to reduce bleed.

In accordance with one embodiment of the present invention, a color inkjet printer is provided, with one print cartridge for dispensing black ink onto the printing medium and at least one print cartridge for dispensing color ink onto the printing medium. The colorant in the black and color inks may be either dye-based or pigment-based or a combination thereof. See U.S. patent application entitled COLOR INK-JET PRINTER WITH PIGMENT BLACK AND DYE-BASED COLOR INKS, Ser. No. 08/234,209, filed Apr. 28, 1994, which is assigned to the present assignee and is herein incorporated by reference. The cartridge for dispensing black ink contains an ink with little or no surface active agent i.e., an ink having a surface tension exceeding about 30 dynes/cm. while the cartridge for dispensing color inks contains a sufficient amount of surface active agent to reduce bleed between the color inks. Moreover, the cartridge for dispensing black ink contains an ink which reacts with one or more and preferably all inks contained in the cartridge for dispensing color inks. This reaction reduces bleed on images where the black print is adjacent to the color print to an acceptable level without requiring the black ink to contain surface active agents that would lead to inferior quality black text on the plain paper print medium. The reaction may be initiated by reaction between colorant to colorant, vehicle component to colorant, or vehicle component to vehicle component, or by reaction of a pH-sensitive component of one ink to the pH of an adjacently printed ink. The reaction could conceivably be a precipitation reaction or formation of a gel or other high viscosity substance.

In a preferred embodiment of such a reaction, the specific ink compositions which are prone to color bleed may be formulated in a unique and special manner. The first ink composition of concern will include about 2–7 percent by weight coloring agent and about 1–70 percent by weight solvent. The coloring agent of the first ink composition will include anionic dyes, such as comprising carboxyl and/or carboxylate groups or other aqueous solubilizing groups, as described in greater detail below. The second ink composition of concern (from a color bleed standpoint) will include a precipitating agent therein which is designed to react with the coloring agent in the first ink composition in order to prevent color bleed between the two ink compositions. Specifically, the precipitating agent from the second ink composition and the coloring agent from the first ink composition react to form a solid precipitate. Precipitate formation is facilitated by interaction between the precipitating agent and the groups associated with the coloring agent of the first ink anionic composition. Precipitate formation prevents migration of the coloring agent from the first ink composition into the second ink composition when both compositions are printed adjacent to and in contact with each other. The precipitating agent may consist of a multi-valent metal salt. Exemplary metal cations suitable for use in the multi-valent metal salt include but are not limited to $Ca^{+2}$, $Cu^{+2}$, $Cu^{+2}$, $Ni^{+2}$, $Fe^{+2}$, $La^{+3}$, $Nd^{+3}$, $Y^{+3}$, or $Al^{+3}$. Exemplary anions which may be coupled with these cations include, but are not limited to, $NO_3^{-1}$ $F^-$, $Cl^-$, $Br^-$, $I^-$, $CH_3COO^-$, and $SO_4^{-2}$. Preferably, the second ink composition will include about 1–15 percent by weight multi-valent metal salt.

The second ink composition containing the multi-valent metal salt will further include d selected coloring agent as described in greater detail below which will not physically or chemically react with the precipitating agent. Specifically, the second ink composition will include about 2–7 percent by weight coloring agent, in combination with about 1–70 percent by weight solvent.

When the first ink composition and second ink composition are printed adjacent to and in contact with each other on a substrate, the above-described precipitation reaction will occur between the multi-valent metal salt of the second ink composition and the coloring agent of the first ink composition. While the foregoing reaction does not significantly affect the desired visual/color characteristics of the printed image, it does, in fact, eliminate migration of the coloring agent from the first ink composition into the second ink composition. In addition, while this procedure is primarily described with respect to a dual ink system using a single precipitating agent for the sake of clarity, the concepts are equally applicable to thermal inkjet printing systems/cartridges which involve more than two colored ink compositions. For further details, see U.S. patent application METHOD AND APPARATUS FOR PREVENTING COLOR BLEED IN A MULTI-INK PRINTING SYSTEM, Ser. No. 07/926,259, filed Aug. 5, 1992, now U.S. Pat. issued Jun. 27, 1995, and CATIONIC DYES WITH ADDED MULTI-VALENT CATIONS TO REDUCE BLEED IN THERMAL INKJET INKS, U.S. Pat. No. 5,198,023, both of which are herein incorporated by reference.

In an another embodiment, the reaction to alleviate bleed can be initiated by reaction of a pH-sensitive component of one ink to the pH of an adjacently printed ink. Certain colorants which include both dye and pigment based inks can be used which become insoluble under specific and well defined pH conditions. By forcing the colorants to become insoluble on the page, migration of the colorant is inhibited, thereby helping to reduce bleed between different colors. Rendering the colorant insoluble is achieved by making the colorant come out of solution or to precipitate; this is done by contacting the ink containing the pH-sensitive colorant with another ink having an appropriate pH. For example, the black colorant, i.e., either a black dye or in this case a dispersed pigment, could have a solubility that is pH sensitive. In other words, as the pH of the ink in question is lowered, the colorant will become increasingly insoluble and will "precipitate" out of solution. [Alternatively, there are also colorants where the reverse is true, i.e., as the pH is increased, they become more insoluble.] Thus, if the color inks have a low pH, when the color and black ink contact on the paper, the low pH of the color ink will tend to cause the solubility of the black colorant to decrease or precipitate thus inhibiting bleed. It is also possible to have the vehicle component of the black ink (not the colorant itself) be pH sensitive. Also, clearly the black ink could have a low (or high) pH with the color inks being the inks that are pH sensitive. For further details regarding pH reactions, see U.S. Pat. Nos. 5,181,045 and 5,320,668 which are herein incorporated by reference.

In another embodiment, a colorant that is water soluble is used for the first ink and the second ink used is oil based. The colorant that is water soluble is unable to diffuse into the oil based ink, since the colorant is not soluble in the second ink vehicle. Thus, bleed is prohibited by making the colorant insoluble in a second ink vehicle. For further details see BLACK-TO-COLOR BLEED CONTROL IN THERMAL INKJET PRINTING, U.S. Pat. No. 5,342,440, which is herein incorporated by reference.

In a still further embodiment, the colorants may react together. The colorants are usually charged to make them soluble. In this embodiment the two charged colorants form an insoluble salt pair. In this case the colorants would have to be opposites charged. Alternatively, the counter-ion for one colorant could form an insoluble pair with a second colorant. When the inks were printed adjacent to each other, the counter-ion from the first ink would make the colorant in the second ink insoluble.

In another embodiment, an excess polymer is used which is soluble in the presence of a colorant in the first ink, but not in the presence of the colorant in a second ink. More specifically, one colorant could be pigment dispersed with a negatively charged dispersant. This ink could then be paired with another colorant that is in a vehicle with a cationic charged polymer. The first colorant does not diffuse into the second colorant because it is insoluble in the presence of the cationic polymer.

It is understood that the above-described embodiments are merely provided to illustrate the principles of the present invention, and that other embodiments may readily be devised using these principles by those skilled in the art without departing from the scope and spirit of the invention.

What is claimed is:

1. A method of inkjet printing whereby black ink and color inks from an ink set comprising cyan ink, yellow ink, and magenta ink are dispensed by a color ink-jet printer, comprising the steps of:

(a) providing a black ink;

(b) providing a color ink set comprising a cyan ink, a yellow ink, and a magenta ink, each color ink in said color ink set containing at least one vehicle component and at least one colorant and further formulated such that when said carriage moves said at least one printhead across a print zone and deposits drops of said black ink and drops of said color ink adjacent and in contact with one another on media in said print zone, then either (1) said black ink has a pH within a selected range and each of said color inks includes a pH sensitive component selected from the group consisting of a pH sensitive colorant and a pH sensitive vehicle, said pH of said black ink being such that said pH sensitive component precipitates upon contact with said black ink, thereby substantially reducing bleed between said black ink and each of said color inks; or (2) said black ink includes a polymer having a charge and each of said color inks includes a pigment and a pigment dispersant, said pigment dispersant having an opposite charge of said polymer, such that said pigment is substantially insoluble in the presence of said polymer, thereby substantially reducing bleed between said black ink and each of said color inks; or (3) said black ink includes a pigment and a pigment dispersant and each of said color inks includes a polymer, said pigment dispersant and said polymer being oppositely charged, such that said pigment is substantially insoluble in the presence of said polymer, thereby substantially reducing bleed between said black ink and each of said color inks;

(c) associating said black ink and each of said color inks in said color ink set each with a separate group of nozzles, each group of nozzles contained in a printhead;

(d) positioning each said printhead on a carriage of said color inkjet printer; and (e) moving said carriage across said print zone of said print medium and depositing drops of said black ink and drops of at least one of said color inks such that said black ink and said color ink are deposited onto said print medium adjacent and in contact with one another, whereupon said chemical reaction occurs between said black ink and said color ink or said pH change occurs between adjacently-printed inks such that bleed is substantially reduced therebetween.

2. A color inkjet printer having a plurality of printheads, each printhead containing a reservoir and nozzle group, each reservoir containing an ink which fluidically communicates with a said nozzle group, said printer comprising: a carriage; a first printhead on said carriage; a black ink in said reservoir in said first printhead; a second printhead, a third printhead, and a fourth printhead on said carriage, each said reservoir in said second, third, and fourth printhead containing one of three color inks selected from the group consisting of a cyan ink, and a magenta ink, each said ink containing at least one vehicle component and at least one colorant and further formulated such that when said carriage moves said at least one printhead across a print zone and deposits drops of said black ink and drops of said color ink adjacent and in contact with one another on media in said print zone, then either (1) said black ink has a pH within a selected range and each of said color inks includes a pH sensitive component selected from the group consisting of a pH sensitive colorant and a pH sensitive vehicle, said pH of said black ink being such that said pH sensitive component precipitates upon contact with said black ink, thereby substantially reducing bleed between said black ink and each of said color inks; or (2) said black ink includes a polymer having a charge and each of said color inks includes a pigment and a pigment dispersant, said pigment dispersant having an opposite charge of said polymer, such that said pigment is substantially insoluble in the presence of said polymer, thereby substantially reducing bleed between said black ink and each of said color inks; or (3) said black ink includes a pigment and a pigment dispersant and each of said color inks includes a polymer, said pigment dispersant and said polymer being oppositely charged, such that said pigment is substantially insoluble in the presence of said polymer, thereby substantially reducing bleed between said black ink and each of said color inks, thereby substantially reducing bleed between said black ink and color ink or between one color ink and another color ink.

* * * * *